United States Patent
Kumano et al.

(10) Patent No.: US 7,620,422 B2
(45) Date of Patent: Nov. 17, 2009

(54) WIRELESS TRANSMISSION SYSTEM

(75) Inventors: Kenichi Kumano, Osaka (JP); Akiteru Deguchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 11/477,602

(22) Filed: Jun. 30, 2006

(65) Prior Publication Data

US 2007/0004340 A1    Jan. 4, 2007

(30) Foreign Application Priority Data

Jul. 1, 2005    (JP)    ............... 2005-193522

(51) Int. Cl.
*H04Q 7/20* (2006.01)

(52) U.S. Cl. ............... 455/562.1; 455/561; 455/550.1; 455/553.1; 455/3.03; 455/3.01; 725/62; 725/106; 725/118; 348/14.01; 348/14.02

(58) Field of Classification Search ............. 455/561.1, 455/561.2, 550.1, 557, 3.03, 3.01, 3.06, 422.1, 455/414.1–414.4, 426.1, 426.2, 522.1, 69.127, 455/67.11, 423–425, 500, 517, 11.1, 9, 24, 455/513; 725/62, 106, 118; 348/14.15, 14.01, 348/14.02

See application file for complete search history.

(56) References Cited

U.S. PATENT DOCUMENTS 7,130,586 B2    10/2006    Corbett et al.
7,239,894 B2    7/2007    Corbett et al.
7,295,806 B2    11/2007    Corbett et al.
2003/0045233 A1*    3/2003    Doi ............................. 455/25
2004/0071121 A1*    4/2004    Ishidoshiro .................. 370/338
2004/0148515 A1*    7/2004    Kikuchi ....................... 713/200
2005/0025085 A1*    2/2005    King ........................... 370/315
2005/0043019 A1    2/2005    Nakamura et al.
2005/0058081 A1*    3/2005    Elliott ......................... 370/252

FOREIGN PATENT DOCUMENTS

| JP | 10-51380 A | 2/1998 |
| JP | 2000-299659 A | 10/2000 |
| JP | 2003-163846 | 6/2003 |
| JP | 2005-26733 | 1/2005 |
| WO | 2005/005092 A1 | 6/2005 |

* cited by examiner

*Primary Examiner*—Keith T Ferguson
(74) *Attorney, Agent, or Firm*—Nixon & Vanderhye P.C.

(57) ABSTRACT

A wireless transmission system for transmitting a picture data between a transmitter and a receiver by wireless communication is provided. Each of the receiver and the transmitter is equipped with a directional antenna and a non-directional antenna. A communication of the picture data is performed by using the directional antennas, and a communication of a control data indicating a reception status of the picture data is performed by using the non-directional antennas. The transmitter controls an intensity of a signal radiated from the directional antenna of the transmitter based on the control data so that the intensity becomes a minimum intensity that can transmit the picture data.

9 Claims, 7 Drawing Sheets

WIRELESS TRANSMISSION SYSTEM

This nonprovisional application claims priority under 35 U.S.C. §119(a) on Patent Application No. 2005-193522 filed in Japan on Jul. 1, 2005, the entire contents of which are hereby incorporated by reference.

BACKGROUND

1. Technical Field

The technical field of the present disclosure relates to a wireless transmission system for transmitting data of pictures, sounds, images, and the like by wireless communication.

2. Description of Related Art

Television sets having light weight such as an LCD (Liquid Crystal Display) TV set or a PDP (Plasma Display Panel) TV set have become commonplace in many homes. Such lightweight TV sets can be moved in a house more easily than before. In order to watch pictures on a TV set, it is necessary to use a device that can provide picture contents (a picture contents providing device) such as a DVD player, a digital cassette recorder or a tuner, so that picture contents are sent to the TV set.

Usually, picture contents travel in a cable from the picture contents providing device to the TV set. Recently, a wireless LAN (wireless Local Area Network) can be used instead of the cable for transmitting picture contents from the picture contents providing device to the TV set.

Conventionally, a cable that transmits picture contents is necessary so that pictures can be displayed on the TV set. Therefore, it is necessary to lay an antenna cable in a room where the TV set is installed for watching television. However, if picture contents can be transmitted via the wireless LAN, such a cable becomes needless so that the TV set can be moved in a house freely without limiting the installation place. This advantage has received attention recently, and the wireless transmission of pictures utilizing the wireless LAN has been becoming widely available gradually. As a standard of the wireless LAN, there is IEEE (Institute of Electrical and Electronic Engineers) 802.11, for example. As a standard of the transmission of pictures and sounds on the IP (Internet Protocol), there is RTP (Real-time Transport Protocol), for example.

In addition, JP-A-2003-163846 (hereinafter referred to as a patent document 1) discloses a technique for adjusting approximately a directivity of a picture signal transmission channel by utilizing a test picture displayed on a display of a receiver.

In addition, JP-A-2005-26733 (hereinafter referred to as a patent document 2) discloses a wireless communication device equipped with a first communication means for transmitting and receiving a non-directional communication wave, a second communication means for transmitting and receiving a directional communication wave and a transmission and reception data control means for performing a control such that a low rate data is transmitted and received by the first communication means while a high rate data is transmitted and received by the second communication means.

In order to perform a transmission of pictures via a wireless LAN utilizing a radio wave, it is necessary to provide a picture receiver of a TV set or the like and a picture transmitter of a DVD player or the like with a device for wireless LAN. The device for wireless LAN may be embedded as a wireless LAN module in the picture receiver and the picture transmitter, or it is prepared as an external option to be connected to the picture receiver and the picture transmitter. In either case, power consumption is more than a conventional device since the device for wireless LAN is added. It is important to reduce power consumption as much as possible to make an environment friendly product.

A plurality of wireless LANs using the same radio wave channel may cause interference between them. Therefore, if the wireless LANs using the same radio wave channel are arranged closely to each other, throughputs of the wireless LANs may be restricted. When using a non-directional antenna that has a wide reaching area of the radio wave for obtaining an appropriate throughput with a radio wave of the same channel, it is necessary to cover a corresponding distance (approximately 50 meters for example). In other words, it is difficult to obtain throughputs that are inherent to the wireless LANs using a non-directional antenna in a house if they utilize the same radio wave channel.

Note that the example of conventional structure disclosed in the above patent document 1 or 2 cannot solve the above-mentioned problem (or is insufficient as a solution of the problem).

SUMMARY

A non-limiting aspect provides a wireless transmission system that can suppress an increase of power consumption due to the wireless communication and can restrict interference with signals outputted from other devices.

A wireless transmission system according to a non-limiting embodiment is a wireless transmission system for transmitting a first data between a transmitter and a receiver by using a wireless communication. The receiver is equipped with a first directional antenna for receiving the first data wirelessly. The transmitter is equipped with a second directional antenna for transmitting the first data wirelessly and an intensity control portion for controlling an intensity of a signal radiated from the second directional antenna to be a minimum intensity that can transmit the first data by using the second directional antenna.

According to this structure, an increase of power consumption due to the wireless communication can be suppressed. In addition, since the signal of the first data reaches only within a very small area including and around the area between the transmitter and the receiver, interference with other signals radiated from other wireless communication devices can be reduced compared with a case of using a non-directional antenna for transmitting the signal.

More specifically, for example, the receiver is further equipped with a first non-directional antenna, the transmitter is further equipped with a second non-directional antenna, the receiver and the transmitter perform a communication of a second data indicating a reception status of the first data in the receiver via the first non-directional antenna and the second non-directional antenna, and the intensity control portion controls the intensity based on the second data so that the intensity becomes the minimum intensity.

Further, for example, the receiver and the transmitter perform a communication of a second data indicating a reception status of the first data in the receiver via the first directional antenna and the second directional antenna, and the intensity control portion controls the intensity based on the second data so that the intensity becomes the minimum intensity.

Further, for example, the wireless transmission system further includes an access point having a third non-directional antenna, and the communication of the second data between the receiver and the transmitter is performed via the third non-directional antenna.

Further, for example, the transmitter determines whether or not it is possible to perform the communication of the first data by using the first directional antenna and the second directional antenna in accordance with the second data, and the transmitter includes a switching portion for switching an antenna for transmitting the first data from the second directional antenna to the second non-directional antenna if it is impossible to perform the communication of the first data by using the first directional antenna and the second directional antenna. After switching of the antenna, the communication of the first data between the receiver and the transmitter is performed via the third non-directional antenna by using the first non-directional antenna and the second non-directional antenna.

According to this configuration, a stable communication of the first data can be realized even if a distance between the transmitter and the receiver is relatively long.

More specifically, for example, the first data includes a picture data that is made up of a plurality of consecutive picture frames, and the controlling of the intensity to be the minimum intensity corresponds to maintaining the number of picture frames per unit time that are not transmitted correctly to the receiver in a predetermined permissible delay time at a predetermined value that is larger than zero.

Further, for example, the first directional antenna and the second directional antenna may be directional antennas for performing an optical communication.

As described above, according to one or more non-limiting embodiments of the wireless transmission system, an increase of power consumption due to the wireless communication can be restricted, and interference with other signals radiated from other devices can be reduced.

DESCRIPTION OF THE PREFERRED EMBODIMENTS

First Embodiment

Figure 1:
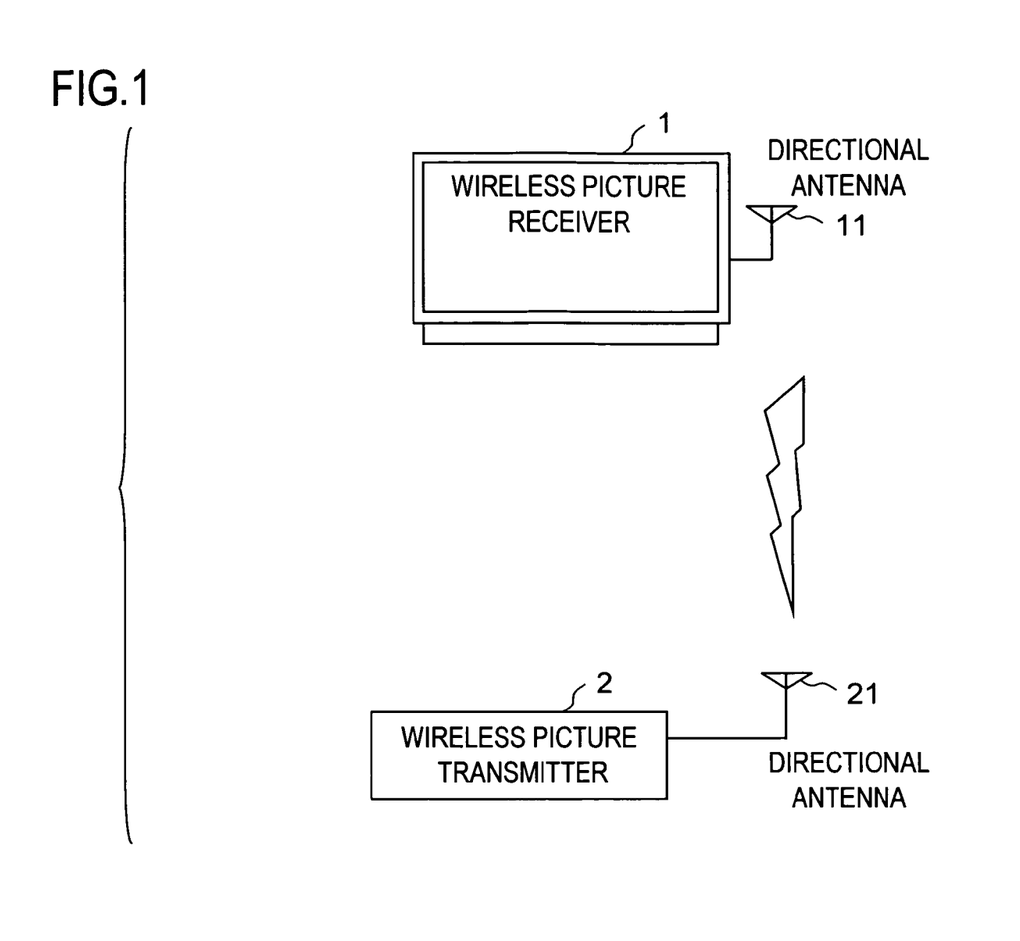
FIG. 1 shows a general structure of a wireless transmission system according to a first non-limiting embodiment.

Hereinafter, a first embodiment of a wireless transmission system will be described in detail with reference to the attached drawings. FIG. 1 shows a general structure of the wireless transmission system according to the first embodiment.

[General Structure]

The wireless transmission system according to the first embodiment is equipped with a wireless picture receiver 1 (hereinafter referred to as a "receiver 1") having a directional antenna 11 and a wireless picture transmitter 2 (hereinafter referred to as a "transmitter 2") having a directional antenna 21. It is assumed in the first embodiment that a distance between the transmitter 2 and the receiver 1 is relatively short so that radio wave for communication by using the directional antennas 11 and 21 can travel sufficiently between the transmitter 2 and the receiver 1.

Data transmitted from the transmitter 2 to the receiver 1 via the directional antennas 11 and 21 is picture data representing pictures, sound data representing sounds, or the like. Hereinafter, it is assumed that the data transmitted from the transmitter 2 to the receiver 1 via the directional antennas 11 and 21 is picture data. The communication between the transmitter 2 and the receiver 1 is performed by a wireless LAN (a wireless Local Area Network).

The picture contents as the picture data is recorded in the transmitter 2. The transmitter 2 transmits the picture data from the directional antenna 21 via the wireless LAN. The receiver 1 receives the picture data by the directional antenna 11 and displays picture contents based on the received picture data. The picture data to be transmitted can be made up of a plurality of consecutive picture frames (picture frame data). Therefore, the transmitter 2 transmits the picture frames one by one to the receiver 1, and the receiver 1 receives the picture frames one by one and displays the picture contents.

An intensity of the radio wave outputted from the directional antenna 21 is determined by a preset value stored in the transmitter 2. This preset value is set appropriately so that reproduction of the pictures is performed correctly while the intensity of the radio wave from the transmitter 2 can be restricted to a small value, thereby low power consumption is achieved.

[Receiver]

Figure 2:
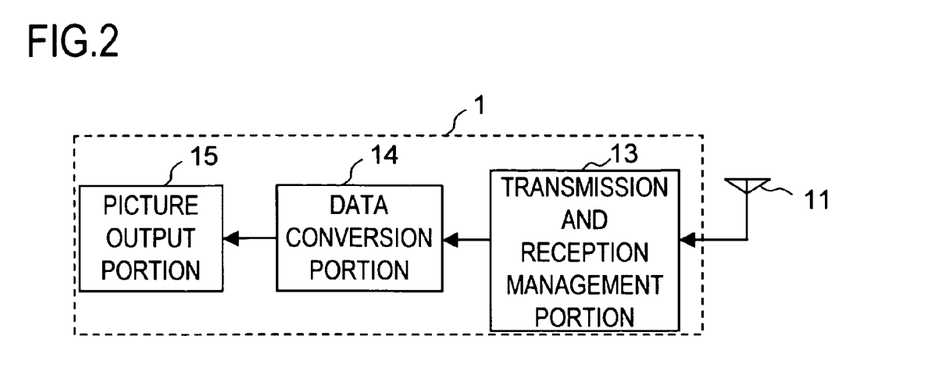
FIG. 2 is a block diagram showing a structure of a receiver shown in FIG. 1.

FIG. 2 is a block diagram showing a structure of the receiver 1 shown in FIG. 1. In FIG. 2, the same parts as in FIG. 1 are denoted by the same reference numerals. The receiver 1 includes the directional antenna 11, a transmission and reception management portion (a wireless LAN transmission and reception management portion) 13, a data conversion portion (a wireless LAN data conversion portion) 14 and a picture output portion (a display portion) 15.

The directional antenna 11 of the receiver 1 and the directional antenna 21 of the transmitter 2 are antennas having a directivity such as a figure-of-eight directivity that indicates a relatively sharp sensitivity in the forward and backward directions or a single directivity that indicates a relatively sharp sensitivity only in one direction. The directional antenna 11 receives the picture data transmitted from the directional antenna 21 of the transmitter 2 via the wireless LAN. The picture data received by the directional antenna 11 is sent to the transmission and reception management portion 13.

The picture data transmitted from the transmitter 2 is provided with an additional data for detecting an error (a reception error) by the receiver 1 for each picture frame, for example. The transmission and reception management portion 13 checks whether or not the picture data (each picture frames, for example) sent from the directional antenna 11 has an error in accordance with the additional data. If the picture data (picture frame) has no error, the transmission and reception management portion 13 sends the received picture data (picture frame) to the data conversion portion 14 and creates an acknowledge data (an ACK frame), which is sent to the directional antenna 11. The directional antenna 11 converts the acknowledge data into a radio wave, which is sent to the transmitter 2. On the contrary, if the picture data (picture frame) sent from the directional antenna 11 has an error, the transmission and reception management portion 13 abandons the received picture data (picture frame). In this case, the acknowledge data is not created.

The data conversion portion 14 converts the picture data (picture frame) sent from the transmission and reception management portion 13 into a data format that enables the picture output portion 15 to output pictures and sends the same to the picture output portion 15. The picture output portion 15 is a picture display device such as an LCD (Liquid Crystal Display) panel or a PDP (Plasma Display Panel), which displays the picture data (picture frame) sent from the data conversion portion 14 to be pictures that a user can watch.

[Transmitter]

Figure 3:
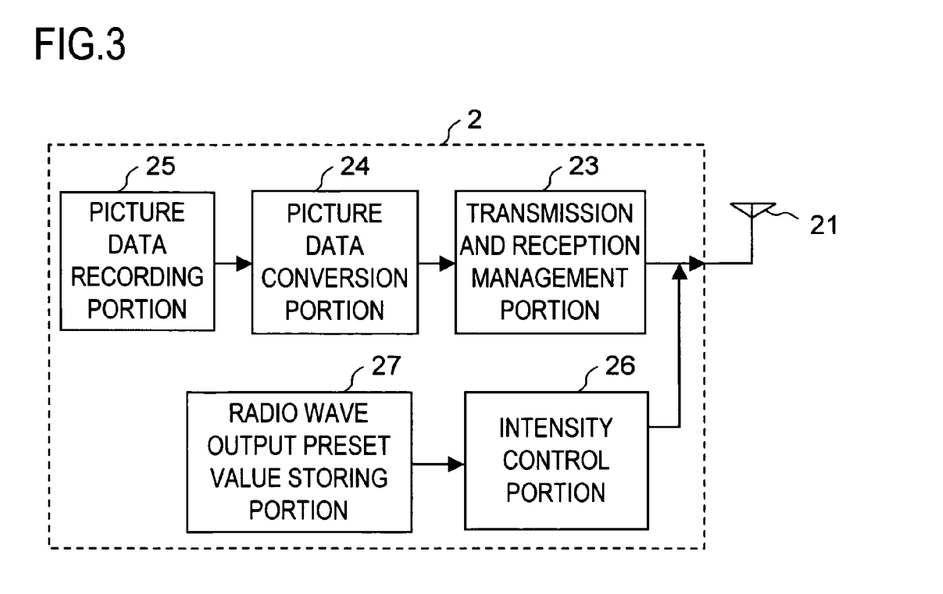
FIG. 3 is a block diagram showing a structure of a transmitter shown in FIG. 1.

FIG. 3 is a block diagram showing a structure of a transmitter 2 shown in FIG. 1. In FIG. 3, the same parts as in FIG. 1 are denoted by the same reference numerals. The transmitter 2 includes the directional antenna 21, the transmission and reception management portion (wireless LAN transmission and reception management portion) 23, the picture data conversion portion 24, a picture data recording portion 25, an intensity control portion (radio wave output control portion) 26 and a radio wave output preset value storing portion 27.

The picture data recording portion 25 is a recording medium such as a DVD (Digital Versatile Disk) or a hard disk, which stores picture contents. The picture data recording portion 25 is an element constituting a DVD reproducing device or a hard disk recorder, for example. In response to a user's request for picture transmission, the picture data showing picture contents is sent from the picture data recording portion 25 to the picture data conversion portion 24.

The picture data conversion portion 24 converts the picture data sent from the picture data recording portion 25 into a data format that can be transmitted via the wireless LAN, and the converted picture data is sent to the transmission and reception management portion 23. The transmission and reception management portion 23 relays the picture data sent from the picture data conversion portion 24 to the directional antenna 21. In this case, an additional data for detecting an error (reception error) by the receiver 1 is added to the picture data in advance for each picture frame, for example. The directional antenna 21 converts the picture data sent from the transmission and reception management portion 23 into a radio wave, which is transmitted to the receiver 1.

The radio wave output preset value storing portion 27 stores a preset value for determining an intensity of the signal radiated (outputted) from the directional antenna 21 (i.e., an intensity of the radio wave). Hereinafter, the intensity of the signal radiated from the directional antenna 21 may be referred to as a "transmission signal intensity $\alpha$". The transmission signal intensity $\alpha$ defines a power (transmission power) of the signal radiated from the directional antenna 21. The above-mentioned preset value is given to the intensity control portion 26, which alters an amplification factor of a transmission amplifier (not shown) that is provided before the directional antenna 21, for example, so that the transmission signal intensity $\alpha$ becomes an intensity corresponding to the preset value. The directional antenna 21 outputs the picture data as the radio wave at a signal intensity corresponding to the above-mentioned preset value. A transmission of the above-mentioned preset value to the intensity control portion 26 may be performed periodically at a constant time interval or only once when the transmitter 2 is activated. Alternatively, it may be performed at a predetermined time.

In addition, it is desirable to set the preset value so that the transmission signal intensity $\alpha$ becomes a minimum intensity that is sufficient to transmit the picture data. Thus, power consumption can be minimized.

It is preferable to set the preset value as a fixed value such that the transmission signal intensity $\alpha$ becomes a minimum intensity that is sufficient to transmit the picture data in the manufacturing process or in the outgoing inspection of the wireless transmission system in the case where a distance between the transmitter 2 and the receiver 1 is fixed in advance, or a distance between the directional antennas 21 and 11 is fixed in advance, for example. Alternatively, it is preferable that a user can alter the preset value by a certain operation. It is possible by this alteration of the preset value to set the transmission signal intensity $\alpha$ to a minimum intensity that is sufficient to transmit the picture data.

In addition, after transmission of the picture data (picture frame), the above-mentioned acknowledge data is sent back from the receiver 1. The directional antenna 21 receives the acknowledge data, which is sent to the transmission and reception management portion 23. When the transmission and reception management portion 23 receives the acknowledge data from the directional antenna 21, it determines that the transmission of the picture data (picture frame) corresponding to the acknowledge data has been succeeded. On the contrary, if no acknowledge data is transmitted from the directional antenna 21 in a predetermined time period, the transmission and reception management portion 23 determines that the transmission of the picture data (picture frame) failed, and it transmits the same picture data (picture frame) again (retransmission).

If this failure is repeated a predetermined number of times, the retransmission is stopped (and a notice of communication error is issued, for example). In addition, when this failure is repeated a predetermined number of times, a predetermined offset value may be added to the preset value to make a sum thereof as a new preset value so that the signal intensity (transmission signal intensity $\alpha$) radiated from the directional antenna 21 may become an intensity corresponding to the new preset value. In other words, the transmission signal intensity $\alpha$ is increased by increasing the preset value to be adopted. In this case, the directional antenna 21 outputs the picture data as a radio wave at a signal intensity corresponding to the new preset value. It is possible to configure so that the intensity control portion 26 resets the preset value for determining the transmission signal intensity $\alpha$ to an initial value (i.e., the preset value stored in the radio wave output preset value storing portion 27) periodically at a constant time interval or at a predetermined time.

When the transmission signal intensity $\alpha$ decreases, the number of error frames (picture frames having an error received by the receiver) increases resulting in a disturbance of reproduced pictures (pictures outputted from the picture output portion 15). However, if the transmitter 2 (or 2a or 2b that will appear below) retransmits the picture data (picture frame) so that the retransmitted picture data (picture frames) reaches the receiver 1 (or 1a or 1b that will appear below) in a predetermined permissible delay time without an error (i.e., correctly), no disturbance appears in the reproduced picture. In other words, no disturbance appears in the reproduced picture as long as the number of picture frames per unit time that are not transmitted correctly to the receiver 1 (or 1a or 1b that will appear below) in the permissible delay time is maintained at zero, even if there is an error frame.

The condition that the transmission signal intensity $\alpha$ becomes a minimum intensity that is sufficient to transmit the picture data means that the number of picture frames per unit time that are not transmitted correctly to the receiver 1 (or 1a or 1b that will appear below) in the permissible delay time is maintained at a predetermined reference value ref1. The reference value ref1 is a constant value that is larger than zero and is preferably a small value as near as possible to zero. The permissible delay time is determined by a picture rate that is unique to the wireless transmission system. Therefore, when the picture rate is fixed, the permissible delay time is automatically fixed. Accordingly, it can be said that when the picture rate is fixed, the above-mentioned "minimum intensity" is automatically fixed.

In the first embodiment described above, an adjustment of the transmission signal intensity α in the transmitter 2 is noted in particular since transmission quantity of the picture data from the transmitter 2 is large. However, it is possible to provide a mechanism similar to that for adjusting the intensity of signal radiated from the directional antenna 21 of the transmitter 2 so that the intensity of the signal (that indicates an acknowledge data) radiated from the directional antenna 11 of the receiver 1 is also adjusted. In this case, the intensity of signal radiated from the directional antenna 11 of the receiver 1 is set by a data outputted from the directional antenna 21 of the transmitter 2.

Second Embodiment

Figure 4:
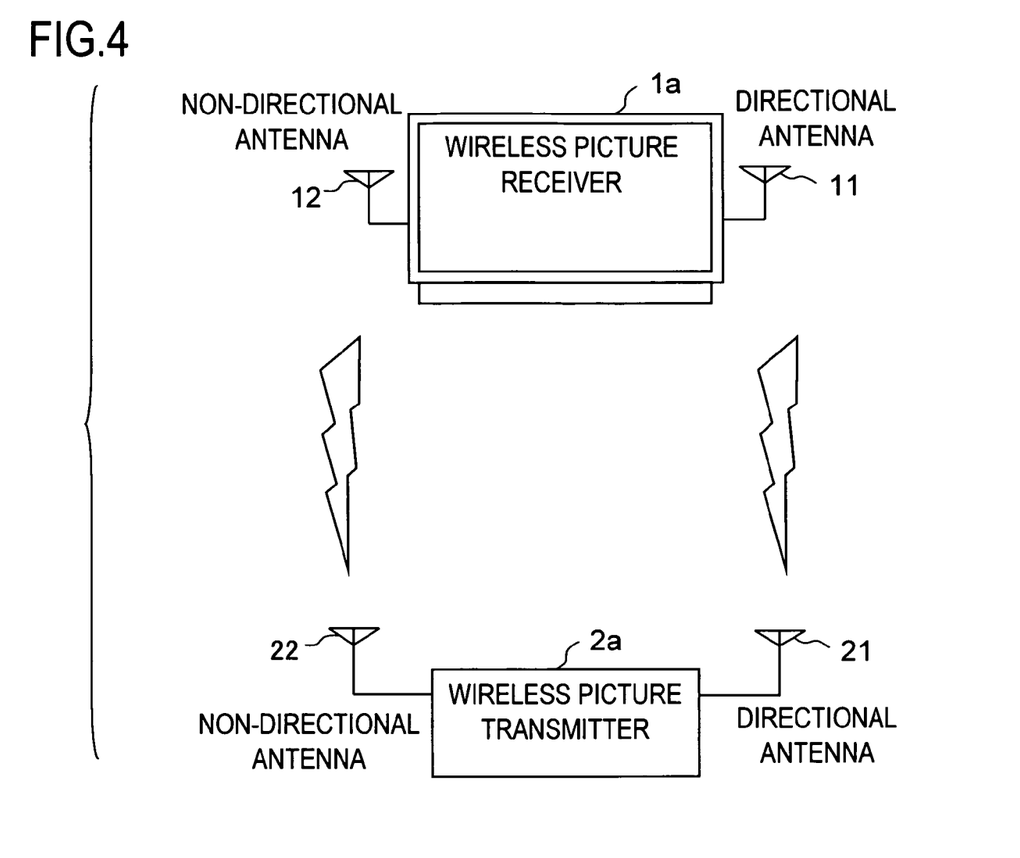
FIG. 4 shows a general structure of a wireless transmission system according to a second non-limiting embodiment.

Next, a second embodiment of the wireless transmission system according to the present invention will be described in detail with reference to the attached drawings. FIG. 4 shows a general structure of the wireless transmission system according to a second embodiment. In FIG. 4, the same parts as in FIG. 1 are denoted by the same reference numerals.

[General Structure]

The wireless transmission system according to the second embodiment is equipped with a wireless picture receiver 1a (hereinafter referred to as a "receiver 1a") having a directional antenna 11 and a non-directional antenna 12 and also with a wireless picture transmitter 2a (hereinafter referred to as a "transmitter 2a") having a directional antenna 21 and a non-directional antenna 22. Similarly to the first embodiment, the second embodiment is assumed that a distance between the transmitter 2a and the receiver 1a is relatively short so that radio wave for communication by using the directional antennas 11 and 21 can travel sufficiently between the transmitter 2a and the receiver 1a.

A data transmitted from the transmitter 2a to the receiver 1a via the directional antennas 11 and 21 is a picture data representing pictures, a sound data representing sounds, or the like. Hereinafter, it is assumed that the data transmitted from the transmitter 2a to the receiver 1a via the directional antennas 11 and 21 is picture data. The communication between the transmitter 2a and the receiver 1a is performed by a wireless LAN.

The picture contents as the picture data is recorded in the transmitter 2a. The transmitter 2a transmits the picture data from the directional antenna 21 via the wireless LAN. The receiver 1a receives the picture data by the directional antenna 11 and displays picture contents based on the received picture data. The picture data to be transmitted is made up of a plurality of consecutive picture frames (picture frame data). Therefore, the transmitter 2a transmits the picture frames one by one to the receiver 1a, and the receiver 1a receives the picture frames one by one and displays the picture contents.

An intensity control data for controlling intensity of the signal radiated (outputted) from the directional antenna 21 is transmitted from the receiver 1a to the transmitter 2a via the non-directional antennas 12 and 22. The intensity control data is used for controlling the intensity of signal radiated (outputted) from the directional antenna 21, so that the intensity of signal radiated from the directional antenna 21 is minimized for reducing power consumption within a range where a picture disturbance does not appear in the receiver 1a.

[Receiver]

Figure 5:
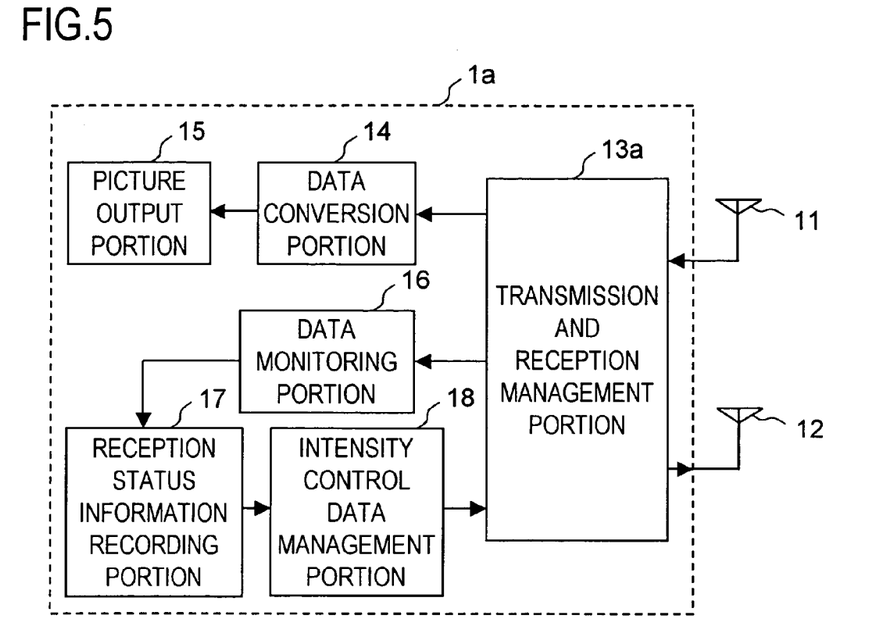
FIG. 5 is a block diagram showing a structure of a receiver shown in FIG. 4.

FIG. 5 is a block diagram showing a structure of the receiver 1a shown in FIG. 4. In FIG. 5, the same parts as in FIGS. 2 and 4 are denoted by the same reference numerals, so that overlapping descriptions for the parts may be omitted. The receiver 1a includes the directional antenna 11, a non-directional antenna 12 that has no directivity, a transmission and reception management portion (wireless LAN transmission and reception management portion) 13a, a data conversion portion (wireless LAN data conversion portion) 14, a picture output portion (display portion) 15, a data monitoring portion (wireless LAN data monitoring portion) 16, a reception status information recording portion 17, and an intensity control data management portion 18.

The directional antenna 11 receives the picture data transmitted from the directional antenna 21 of the transmitter 2a via the wireless LAN. The picture data received by the directional antenna 11 is sent to the transmission and reception management portion 13a.

The picture data transmitted from the transmitter 2a is provided with an additional data for detecting an error (a reception error) by the receiver 1a for each picture frame, for example. The transmission and reception management portion 13a checks whether or not the picture data (each of picture frames, for example) sent from the directional antenna 11 has an error in accordance with the additional data. If the picture data (picture frame) has no error, the transmission and reception management portion 13a sends the received picture data (picture frame) to the data conversion portion 14 and creates an acknowledge data, which is sent to the directional antenna 11. The directional antenna 11 converts the acknowledge data into a radio wave, which is sent to the transmitter 2a. On the contrary, if the picture data (picture frame) sent from the directional antenna 11 has an error, the transmission and reception management portion 13a abandons the received picture data (picture frame). In this case, the acknowledge data is not created. An operation of the data conversion portion 14 that receives the picture data and an operation of the picture output portion 15 are the same as described in the first embodiment.

The data monitoring portion 16 creates reception status information indicating a reception status of the picture data in accordance with information from the transmission and reception management portion 13a. The reception status information is, for example, a reception error rate (a ratio of the number of error frames to the number of picture frames received in a unit time) or a total number of reception errors (a total number of error frames) in a period after starting reception of the picture data. Alternatively, the reception status information is the number of picture frames in a unit time that were not transmitted to the receiver 1a correctly within the above-mentioned permissible delay time (hereinafter referred to as "the number A1"), for example. Alternatively, the reception status information may be a total number of picture frames that were not transmitted to the receiver 1a correctly within the above-mentioned permissible delay time after starting reception of the picture data (hereinafter referred to as "a total number A2"). It can be said that the reception error rate, the total number of reception errors, the number A1 and the total number A2 are data about good or no good in reception of the picture data or a data corresponding to good or no good in reception of the picture data.

In addition, the reception status information may be, for example, a power received by the directional antenna 11 (that is a power of the signal of the picture data received by the directional antenna 11; hereinafter referred to as a "reception power A3"). In addition, the reception status information may be, for example, the number of occurrence times of noises per unit time. Note that the data monitoring portion 16 may obtain the information for creating the reception status information periodically at a constant time interval or at a fixed time point.

The data monitoring portion 16 sends the created reception status information to the reception status information recording portion 17, and the reception status information recording portion 17 receives and records the reception status information. Then, the intensity control data management portion 18 obtains the reception status information from the reception status information recording portion 17 and creates the intensity control data in accordance with the reception status information. The intensity control data is used for controlling the signal intensity (transmission signal intensity $\alpha$) that is radiated (outputted) from the directional antenna 21. Note that the intensity control data management portion 18 may obtain the reception status information periodically at a constant time interval or at a fixed time point. As being clear from the description below, the transmission signal intensity $\alpha$ becomes an intensity corresponding to this intensity control data.

For example, the intensity control data is created in such a way that the transmission signal intensity $\alpha$ increases when reception status information (e.g., the reception error rate or the like) is equal to or larger than a predetermined value (or when the reception status information is less than the predetermined value if the reception status information is the reception power A3). This intensity control data may be a data that simply instructs an increase of the transmission signal intensity $\alpha$ or a data that requests an increase of the transmission signal intensity $\alpha$ to a designated signal intensity.

In addition, the intensity control data is created in such a way that the transmission signal intensity $\alpha$ is decreased when the reception status information (e.g., the reception error rate or the like) is less than the predetermined value (or when the reception status information is equal to or larger than the predetermined value if the reception status information is the reception power A3). Thus, the reception status information is kept at a predetermined value so that the transmission signal intensity $\alpha$ is kept substantially at a constant value. In this case, it is desirable to set the predetermined value so that the transmission signal intensity $\alpha$ is kept to a minimum intensity that can transmit the picture data.

The intensity control data created by the intensity control data management portion 18 is sent to the transmission and reception management portion 13a. The transmission and reception management portion 13a relays the transmitted intensity control data to the non-directional antenna 12. The non-directional antenna 12 receives the intensity control data transmitted from the transmission and reception management portion 13a and output the same as a radio wave to the transmitter 2a.

In addition, after the intensity control data is transmitted, an acknowledge data is sent back from the non-directional antenna 22 of the transmitter 2a for informing of reception of the intensity control data. The non-directional antenna 12 receives the acknowledge data and send the same to the transmission and reception management portion 13a. When the transmission and reception management portion 13a receives the acknowledge data from the non-directional antenna 12, it determines that the intensity control data has been transmitted successfully. On the contrary, if the acknowledge data is not received from the non-directional antenna 12 in a predetermined time period, the transmission and reception management portion 13a determines that the transmission of the intensity control data had failed and transmits the same intensity control data again (retransmission). If this failure is repeated a predetermined number of times, the retransmission is stopped (and a notice of communication error is issued, for example).

[Transmitter]

Figure 6:
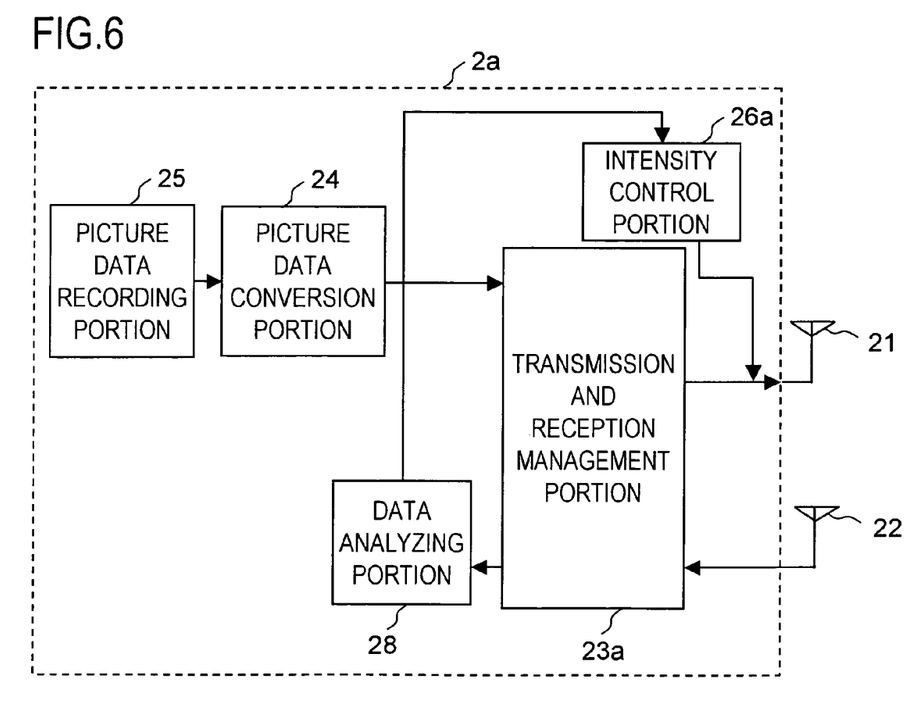
FIG. 6 is a block diagram showing a structure of a transmitter shown in FIG. 4.

FIG. 6 is a block diagram showing a structure of the transmitter 2a shown in FIG. 4. In FIG. 6, the same parts as in FIGS. 3 and 4 are denoted by the same reference numerals, and overlapping descriptions for the parts may be omitted. The transmitter 2a includes the directional antenna 21, the non-directional antenna 22 that has no directivity, a transmission and reception management portion (wireless LAN transmission and reception management portion) 23a, the picture data conversion portion 24, the picture data recording portion 25, an intensity control portion 26a, and a data analyzing portion 28.

Responding to a request for transmission of pictures from a user, picture data showing picture contents is sent to the picture data conversion portion 24 from the picture data recording portion 25. The picture data conversion portion 24 converts the picture data sent from the picture data recording portion 25 into a data format that can be transmitted via the wireless LAN, and the converted picture data is sent to the transmission and reception management portion 23a. The transmission and reception management portion 23a relays the picture data sent from the picture data conversion portion 24 to the directional antenna 21. In this case, an additional data for detecting an error (reception error) by the receiver 1a is added to the picture data in advance for each picture frame, for example. The directional antenna 21 converts the picture data sent from the transmission and reception management portion 23a into a radio wave and transmits the same to the receiver 1a.

In addition, after the picture data (picture frame) is transmitted, the above-mentioned acknowledge data is sent back from the directional antenna 11 of the receiver 1a. The directional antenna 21 receives the acknowledge data and sends the same to the transmission and reception management portion 23a. When the transmission and reception management portion 23a receives the acknowledge data from the directional antenna 21, it determines that the picture data (picture frame) corresponding to the acknowledge data has been transmitted successfully. On the contrary, if the acknowledge data is not received from the directional antenna 21 in a predetermined time period, the transmission and reception management portion 23a determines that the transmission of the picture data (picture frame) was failed and transmits the same picture data (picture frame) again (retransmission). If this failure is repeated a predetermined number of times, the retransmission is stopped (and a notice of communication error is issued, for example).

The non-directional antenna 22 receives the intensity control data transmitted from the receiver 1a and sends the received intensity control data to the transmission and reception management portion 23a. The data for detecting an error (reception error) by the transmitter 2a is added to the intensity control data transmitted from the receiver 1a, and the transmission and reception management portion 23a determines whether or not the intensity control data transmitted from the non-directional antenna 22 has an error in accordance with the added data. If the intensity control data has no error, the transmission and reception management portion 23a sends the received intensity control data to the data analyzing portion 28 and creates an acknowledge data for notifying the reception of the intensity control data. The acknowledge data is sent to the non-directional antenna 22. The non-directional antenna 22 converts the acknowledge data into a radio wave, which is transmitted to the receiver 1a. On the contrary, if the intensity control data transmitted from the non-directional antenna 22 has an error, the transmission and reception management portion 23a does not create the acknowledge data.

The data analyzing portion 28 analyzes the intensity control data transmitted from the transmission and reception management portion 23a, converts the intensity control data into a form that can be used by the intensity control portion 26a, and sends the converted intensity control data to the intensity control portion 26a. The intensity control portion 26a alters an amplification factor of a transmission amplifier (no shown) that is disposed before the directional antenna 21, for example, so that the signal intensity (transmission signal intensity $\alpha$) radiated (outputted) from the directional antenna 21 becomes an intensity corresponding to the intensity control data transmitted from the data analyzing portion 28. The directional antenna 21 outputs the picture data as a radio wave at the signal intensity designated by the intensity control portion 26a.

For example, if the intensity control data transmitted from the receiver 1a is a data that requests an increase of the transmission signal intensity $\alpha$, the intensity control portion 26a performs a control for increasing the transmission signal intensity $\alpha$. If the intensity control data transmitted from the receiver 1a is a data that requests a decrease of the transmission signal intensity $\alpha$, the intensity control portion 26a performs a control for decreasing the transmission signal intensity $\alpha$.

Note that the data analyzing portion 28 may transmit the intensity control data to the intensity control portion 26 periodically at a constant time interval or at a fixed time point. Alternatively, it is possible to transmit only once when the transmitter 2a is activated. Alternatively, it is possible to configure that an initial value of the transmission signal intensity $\alpha$ is predetermined, and the intensity control portion 26a resets the transmission signal intensity $\alpha$ to the initial value periodically at a constant time interval or at a fixed time point.

Although the non-directional antennas 12 and 22 are used for transmitting the intensity control data from the receiver 1a to the transmitter 2a in the example described above, it is possible to use the directional antennas 11 and 21 for transmitting the intensity control data. More specifically, it is possible to configure so that the intensity control data from the intensity control data management portion 18 is transmitted from the directional antenna 11, and the intensity control data is received by the directional antenna 21. In this case, similarly to the above-described case, the transmission signal intensity $\alpha$ is controlled in accordance with the intensity control data.

In addition, if the acknowledge data is not received from the directional antenna 21 in a predetermined time period after the transmission of the picture data (picture frame), the transmission and reception management portion 23a transmits the same picture data (picture frame) again (retransmission). However, it is possible to configure so that the intensity control portion 26a controls the transmission signal intensity $\alpha$ in such a way that the number of times of the retransmission in a unit time is kept at a predetermined reference value ref2 (constant value) (in this case, the intensity control data is not used for controlling the transmission signal intensity $\alpha$). More specifically, it is preferable to increase the transmission signal intensity $\alpha$ if the number of the retransmission times per unit time is larger than the reference value ref2 and to decrease the transmission signal intensity $\alpha$ if the number of the retransmission times per unit time is smaller than the reference value ref2. Thus, the number of the retransmission times per unit time is maintained at the reference value ref2. As a result, the transmission signal intensity $\alpha$ can be kept at substantially a constant value. In this case, it is desirable to set the reference value ref2 to a value such that the transmission signal intensity $\alpha$ is kept at a minimum intensity that can transmit the picture data.

In addition, it is possible to control the transmission signal intensity $\alpha$ corresponding to a reception power of the acknowledge data transmitted from the receiver 1a to the transmitter 2a (a power of the signal of the acknowledge data received by the transmitter 2a) (in this case, the intensity control data is not used for controlling the transmission signal intensity $\alpha$). More specifically, the larger the reception power is, the smaller the transmission signal intensity $\alpha$ is. The smaller the reception power is, the larger the transmission signal intensity $\alpha$ is. In this case too, it is desirable to control the transmission signal intensity $\alpha$ corresponding to the reception power so that the transmission signal intensity $\alpha$ becomes a minimum intensity that can transmit the picture data.

In the second embodiment described above, an adjustment of the transmission signal intensity $\alpha$ in the transmitter 2a is noted in particular since transmission quantity of the picture data from the transmitter 2a is large. However, it is possible to provide a mechanism similar to that for adjusting the intensity of the signal radiated from the directional antenna 21 of the transmitter 2a and also to adjust an intensity of the signal (showing the acknowledge data) radiated from the directional antenna 11 of the receiver 1a. In this case, the intensity of the signal radiated from the directional antenna 11 of the receiver 1a is set by a data outputted from the directional antenna 21 of the transmitter 2a.

Third Embodiment

Figure 7:
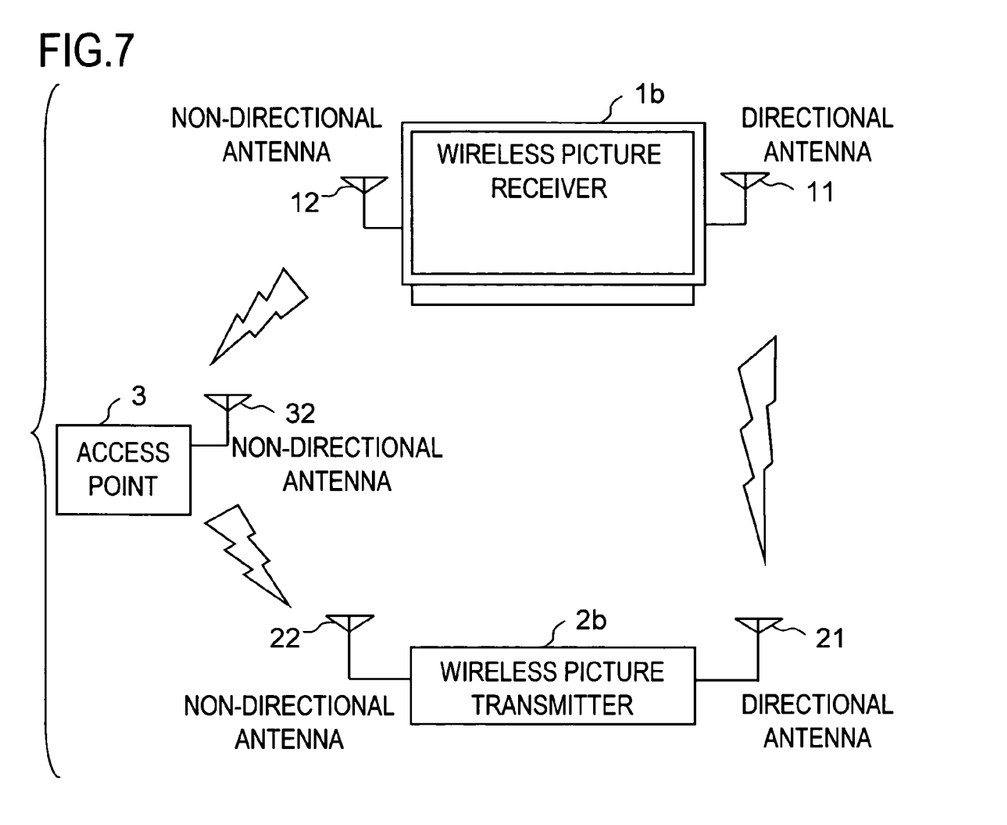
FIG. 7 shows a general structure of a wireless transmission system according to a third non-limiting embodiment.

Next, a third embodiment of the wireless transmission system according to the present invention will be described in detail with reference to the attached drawings. FIG. 7 shows a general structure of a wireless transmission system according to the third embodiment. In FIG. 7, the same parts as in FIGS. 1 and 4 are denoted by the same reference numerals.

[General Structure]

The wireless transmission system according to the third embodiment is equipped with a wireless picture receiver 1b (hereinafter referred to as a "receiver 1b") having a directional antenna 11 and a non-directional antenna 12, a wireless picture transmitter 2b (hereinafter referred to as a "transmitter 2b") having a directional antenna 21 and a non-directional antenna 22, and an access point 3 for relaying communication between the non-directional antennas 12 and 22. The access point 3 has a non-directional antenna 32 having no directivity. The wireless transmission system according to the third embodiment can be used in either case where a distance between the transmitter 2b and the receiver 1b is relatively short or long. In other words, it can be used in either case where a radio wave for communication by using the directional antennas 11 and 21 travels either sufficiently or insufficiently between the transmitter 2b and the receiver 1b.

Data to be transmitted from the transmitter 2b to the receiver 1b can be picture data representing pictures, sound data representing sounds, or the like. Hereinafter, it is assumed that the data to be transmitted from the transmitter 2b to the receiver 1b is picture data. The communication between the transmitter 2b and the receiver 1b is performed by a wireless LAN.

The picture contents as the picture data are recorded in the transmitter 2b. The transmitter 2b transmits the picture data from the directional antenna 21 or the non-directional antenna 22 via the wireless LAN. The receiver 1b receives the picture data by the directional antenna 11 or the non-directional antenna 12 and displays the picture contents in accordance with the received picture data. The picture data to be transmitted is made up of a plurality of consecutive picture frames (picture frame data). Therefore, the transmitter 2b transmits the picture frames one by one to the receiver 1b, and the receiver 1b receives the picture frames one by one and displays the picture contents.

An intensity control data for controlling intensity of the signal radiated (outputted) from the directional antenna 21 is transmitted from the receiver 1b to the transmitter 2b via the non-directional antennas 12, 32 and 22. More specifically, the intensity control data created in the receiver 1b is first sent from the non-directional antenna 12 of the receiver 1b to the non-directional antenna 32 of the access point 3. Then, the intensity control data is transmitted from the non-directional antenna 32 of the access point 3 to the non-directional antenna 22 of the transmitter 2b. The transmitter 2b controls the intensity of the signal radiated (outputted) from the directional antenna 21 in accordance with the intensity control data sent from the receiver 1b, so that the intensity of signal radiated from the directional antenna 21 is minimized for reducing power consumption within a range where a picture disturbance does not occur in the receiver 1b.

If the picture data from the directional antenna 21 does not reach the directional antenna 11, contents corresponding to the same are incorporated in the intensity control data, which is sent to the transmitter 2b. In this case, the transmitter 2b switches the antenna for transmitting the picture data from the directional antenna 21 to the non-directional antenna 22. The picture data transmitted from the non-directional antenna 22 is received by the non-directional antenna 12 via the access point 3 and is sent to the receiver 1b. Thus, although a decrease of power consumption cannot be expected due to a use of the directional antennas 11 and 22, a stable communication of the picture data can be realized even if a distance between the transmitter and the receiver is relatively long.

[Receiver]

Figure 8:
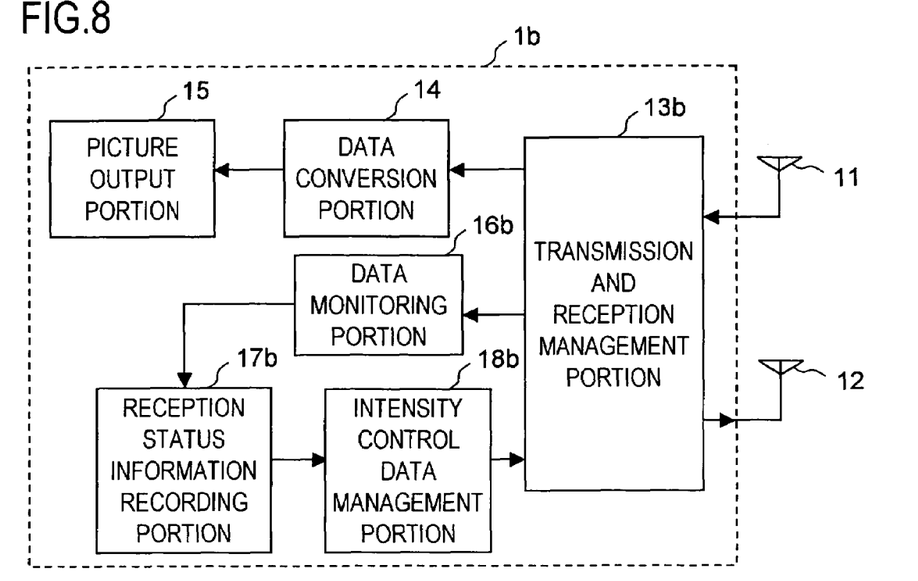
FIG. 8 is a block diagram showing a structure of a receiver shown in FIG. 7.

FIG. 8 is a block diagram showing a structure of the receiver 1b shown in FIG. 7. In FIG. 8, the same parts as in FIGS. 2, 5 and 7 are denoted by the same reference numerals, so that overlapping descriptions for the parts may be omitted. The receiver 1b includes a directional antenna 11, a non-directional antenna 12 that has no directivity, a transmission and reception management portion (wireless LAN transmission and reception management portion) 13b, a data conversion portion (wireless LAN data conversion portion) 14, a picture output portion (display portion) 15, a data monitoring portion (wireless LAN data monitoring portion) 16b, a reception status information recording portion 17b, and an intensity control data management portion 18b.

In principle, the picture data is sent from the transmitter 2b to the receiver 1b via the directional antennas 21 and 11. When this principle operation is performed continuously, the operation in the third embodiment is substantially the same as that in the second embodiment.

The directional antenna 11 receives the picture data transmitted from the directional antenna 21 of the transmitter 2b via the wireless LAN. The picture data received by the directional antenna 11 is sent to the transmission and reception management portion 13b.

The picture data sent from the transmitter 2b is provided with an additional data for detecting an error (a reception error) by the receiver 1b for each picture frame, for example. The transmission and reception management portion 13b checks whether or not the picture data (each of picture frames, for example) sent from the directional antenna 11 has an error in accordance with the additional data. If the picture data (picture frame) has no error, the transmission and reception management portion 13b sends the received picture data (picture frame) to the data conversion portion 14 and creates an acknowledge data, which is sent to the directional antenna 11. The directional antenna 11 converts the acknowledge data into a radio wave, which is sent to the transmitter 2b. On the contrary, if the picture data (picture frame) sent from the directional antenna 11 has an error, the transmission and reception management portion 13b abandons the received picture data (picture frame). In this case, the acknowledge data is not created. An operation of the data conversion portion 14 that receives the picture data and an operation of the picture output portion 15 are the same as described in the first embodiment.

The data monitoring portion 16b creates reception status information indicating a reception status of the picture data in accordance with information from the transmission and reception management portion 13b. The reception status information is, for example, a reception error rate (a ratio of the number of error frames to the number of picture frames received in a unit time) or a total number of reception errors (a total number of error frames) in a period after starting reception of the picture data. Alternatively, the reception status information is the number A1 of picture frames in a unit time that were not transmitted to the receiver 1b correctly within the above-mentioned permissible delay time. Alternatively, the reception status information may be a total number A2 of picture frames that were not transmitted to the receiver 1b correctly within the above-mentioned permissible delay time after starting reception of the picture data. It can be said that the reception error rate, the total number of reception errors, the number A1 and the total number A2 are data about good or no good in reception of the picture data or a data corresponding to good or no good in reception of the picture data.

In addition, the reception status information may be, for example, a reception power A3 of the directional antenna 11 (that is a power of the signal of the picture data received by the directional antenna 11). In addition, the reception status information may be, for example, the number of occurrence times of noises per unit time. Note that the data monitoring portion 16b may obtain the information for creating the reception status information periodically at a constant time interval or at a fixed time point.

The data monitoring portion 16b sends the created reception status information to the reception status information recording portion 17b, and the reception status information recording portion 17b receives and records the reception status information. Then, the intensity control data management portion 18b obtains the reception status information from the reception status information recording portion 17b and creates the intensity control data in accordance with the reception status information. The intensity control data is used for controlling the signal intensity (transmission signal intensity $\alpha$) that is radiated (outputted) from the directional antenna 21. Note that the intensity control data management portion 18b may obtain the reception status information periodically at a constant time interval or at a fixed time point. As being clear from the description below, the transmission signal intensity α becomes an intensity corresponding to this intensity control data.

For example, the intensity control data is created in such a way that the transmission signal intensity α increases when reception status information (e.g., the reception error rate or the like) is equal to or larger than a predetermined value (or when the reception status information is less than the predetermined value if the reception status information is the reception power A3). This intensity control data may be a data that simply instructs an increase of the transmission signal intensity α or a data that requests an increase of the transmission signal intensity α to a designated signal intensity.

In addition, the intensity control data is created in such a way that the transmission signal intensity α is decreased when the reception status information (e.g., the reception error rate or the like) is less than the predetermined value (or when the reception status information is equal to or larger than the predetermined value if the reception status information is the reception power A3). Thus, the reception status information is kept at a predetermined value so that the transmission signal intensity α is kept substantially at a constant value. In this case, it is desirable to set the predetermined value so that the transmission signal intensity α is kept to a minimum intensity that can transmit the picture data.

However, if it is determined that the picture is unworthy of watching by the picture data received by the directional antenna 11, or if the reception status information (e.g., the reception error rate or the like) is larger than or equal to a predetermined threshold level, specifically for example, (or if the reception status information is smaller than the predetermined threshold level in the case where the reception status information is the reception power A3), the intensity control data management portion 18b creates data requesting to transmit the picture data by the non-directional antenna as the intensity control data exceptionally. This intensity control data can be called a communication error data indicating that the communication of the picture data by the directional antennas 11 and 21 is not working correctly.

The intensity control data created by the intensity control data management portion 18b is sent to the transmission and reception management portion 13b. The transmission and reception management portion 13b receives the intensity control data and sends the same to the non-directional antenna 12. The non-directional antenna 12 converts the intensity control data transmitted from the transmission and reception management portion 13b into a radio wave, which is outputted to the transmitter 2b.

In addition, after the transmission of the intensity control data, an acknowledge data is sent back from the non-directional antenna 22 of the transmitter 2b for notifying the reception of the intensity control data. The non-directional antenna 12 receives the acknowledge data and sends the same to the transmission and reception management portion 13b. When the transmission and reception management portion 13b receives the acknowledge data from the non-directional antenna 12, it determines that the intensity control data has been transmitted successfully. On the contrary, if the acknowledge data is not received from the non-directional antenna 12 in a predetermined time period, the transmission and reception management portion 13b determines that the transmission of the intensity control data was failed and transmits the same intensity control data again (retransmission). If this failure is repeated a predetermined number of times, the retransmission is stopped (and a notice of communication error is issued, for example).

[Transmitter]

Figure 9:
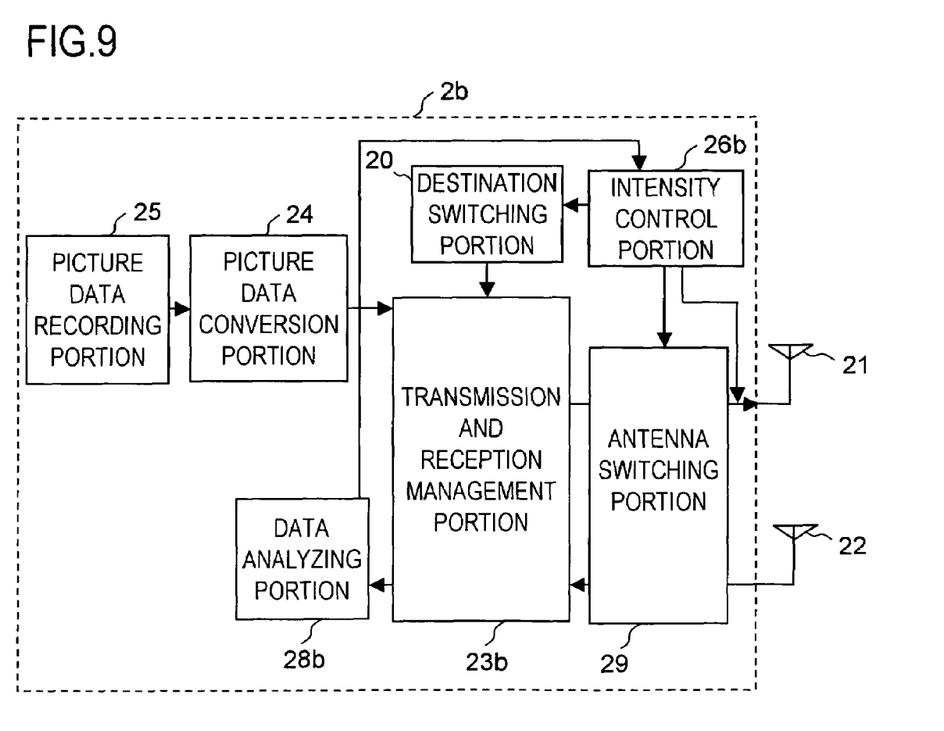
FIG. 9 is a block diagram showing a structure of a transmitter shown in FIG. 7.

FIG. 9 is a block diagram showing a structure of the transmitter 2b shown in FIG. 7. In FIG. 9, the same parts as in FIGS. 3, 6 and 7 are denoted by the same reference numerals, and overlapping descriptions for the parts may be omitted. The transmitter 2b includes the directional antenna 21, the non-directional antenna 22 that has no directivity, a transmission and reception management portion (wireless LAN transmission and reception management portion) 23b, the picture data conversion portion 24, the picture data recording portion 25, an intensity control portion 26b, a data analyzing portion 28b, an antenna switching portion 29, and a destination switching portion 20. A communication of a data (signal) between the transmission and reception management portion 23b and the directional antenna 21 as well as the non-directional antenna 22 is performed via the antenna switching portion 29.

Responding to a request for transmission of pictures from a user, picture data showing picture contents is sent to the picture data conversion portion 24 from the picture data recording portion 25. The picture data conversion portion 24 converts the picture data transmitted from the picture data recording portion 25 into a data format that can be communicated via the wireless LAN, and the converted picture data is sent to the transmission and reception management portion 23b. The transmission and reception management portion 23b relays the picture data sent from the picture data conversion portion 24 to the directional antenna 21 or the non-directional antenna 22 via the antenna switching portion 29. In this case, an additional data for detecting an error (reception error) by the receiver 1b is added to the picture data in advance for each picture frame, for example. The directional antenna 21 or the non-directional antenna 22 converts the picture data sent from the transmission and reception management portion 23b into a radio wave and transmits the same to the receiver 1b.

The antenna that is used for transmission of the picture data is switched between the directional antenna 21 and the non-directional antenna 22. An operation will be described basically about a case where the directional antenna 21 is selected as an antenna that is used for transmission of the picture data. The operation in this case is similar to the operation in the second embodiment.

After transmission of the picture data (picture frame), the above-mentioned acknowledge data is sent back from the directional antenna 11 of the receiver 1b. The directional antenna 21 receives the acknowledge data and sends the acknowledge data to the transmission and reception management portion 23b via the antenna switching portion 29. When the transmission and reception management portion 23b receives the acknowledge data from the directional antenna 21, it determines that the picture data (picture frame) corresponding to the acknowledge data has been transmitted successfully. On the contrary, if the acknowledge data is not received from the directional antenna 21 in a predetermined time period, the transmission and reception management portion 23b determines that the transmission of the picture data (picture frame) failed and transmits the same picture data (picture frame) again (retransmission). If this failure is repeated a predetermined number of times, the retransmission is stopped (and a notice of communication error is issued, for example).

The non-directional antenna 22 receives the intensity control data transmitted from the receiver 1b and sends the received intensity control data to the transmission and reception management portion 23b. The data for detecting an error (reception error) by the transmitter 2b is added to the intensity control data transmitted from the receiver 1*b*, and the transmission and reception management portion 23*b* determines whether or not the intensity control data transmitted from the non-directional antenna 22 has an error in accordance with the added data. If the intensity control data has no error, the transmission and reception management portion 23*b* sends the received intensity control data to the data analyzing portion 28*b* and creates an acknowledge data for notifying the reception of the intensity control data. The acknowledge data is sent to the non-directional antenna 22 via the antenna switching portion 29. The non-directional antenna 22 converts the acknowledge data into a radio wave, which is transmitted to the receiver 1*b*. On the contrary, if the intensity control data transmitted from the non-directional antenna 22 has an error, the transmission and reception management portion 23*b* does not create the acknowledge data.

The data analyzing portion 28*b* analyzes the intensity control data transmitted from the transmission and reception management portion 23*b*, converts the intensity control data into a form that can be used by the intensity control portion 26*b*, and sends the converted intensity control data to the intensity control portion 26*b*. In principle, the intensity control portion 26*b* alters an amplification factor of a transmission amplifier (not shown) that is disposed before the directional antenna 21, for example, so that the signal intensity (transmission signal intensity α) radiated (outputted) from the directional antenna 21 becomes an intensity corresponding to the intensity control data transmitted from the data analyzing portion 28. In this case, the directional antenna 21 outputs the picture data as a radio wave at the signal intensity designated by the intensity control portion 26*b*.

For example, if the intensity control data transmitted from the receiver 1*b* is a data that requests an increase of the transmission signal intensity α, the intensity control portion 26*b* performs a control for increasing the transmission signal intensity α. If the intensity control data transmitted from the receiver 1*b* is a data that requests a decrease of the transmission signal intensity α, the intensity control portion 26*b* performs a control for decreasing the transmission signal intensity α.

Note that the data analyzing portion 28*b* may transmit the intensity control data to the intensity control portion 26*b* periodically at a constant time interval or at a fixed time point. Alternatively, it is possible to transmit only once when the transmitter 2*b* is activated. Alternatively, it is possible to configure that an initial value of the transmission signal intensity α is predetermined, and the intensity control portion 26*b* resets the transmission signal intensity α to the initial value periodically at a constant time interval or at a fixed time point.

An operation will be described about a case where the intensity control data transmitted from the receiver 1*b* is data (communication error data) requesting to transmit the picture data via the non-directional antenna. In this case, the intensity control portion 26*b* informs the destination switching portion 20 that the picture data should be transmitted to the receiver 1*b* via the access point 3 and of an address of the access point 3. It also informs the antenna switching portion 29 that the picture data should be transmitted by using the non-directional antenna 22.

The destination switching portion 20 informs the transmission and reception management portion 23*b* of the address of the access point 3 that was informed by the intensity control portion 26*b*. The antenna switching portion 29 sends the picture data transmitted from the transmission and reception management portion 23*b* to the non-directional antenna 22 so that the picture data will be transmitted from the non-directional antenna 22 in accordance with the information from the intensity control portion 26*b*. The non-directional antenna 22 converts the picture data from the antenna switching portion 29 into a radio wave to be transmitted.

The picture data transmitted from the non-directional antenna 22 is received by the non-directional antenna 12 of the receiver 1*b* via the access point 3 (the non-directional antenna 32 of the access point 3). More specifically, the picture data is once sent from the non-directional antenna 22 of the transmitter 2*b* to the non-directional antenna 32 of the access point 3, and then it is transmitted from the non-directional antenna 32 of the access point 3 to the non-directional antenna 12 of the receiver 1*b*. The picture data received by the non-directional antenna 12 is sent to the data conversion portion 14 via the transmission and reception management portion 13*b* and is displayed as pictures by the picture output portion 15.

[Access Point]

Figure 10:
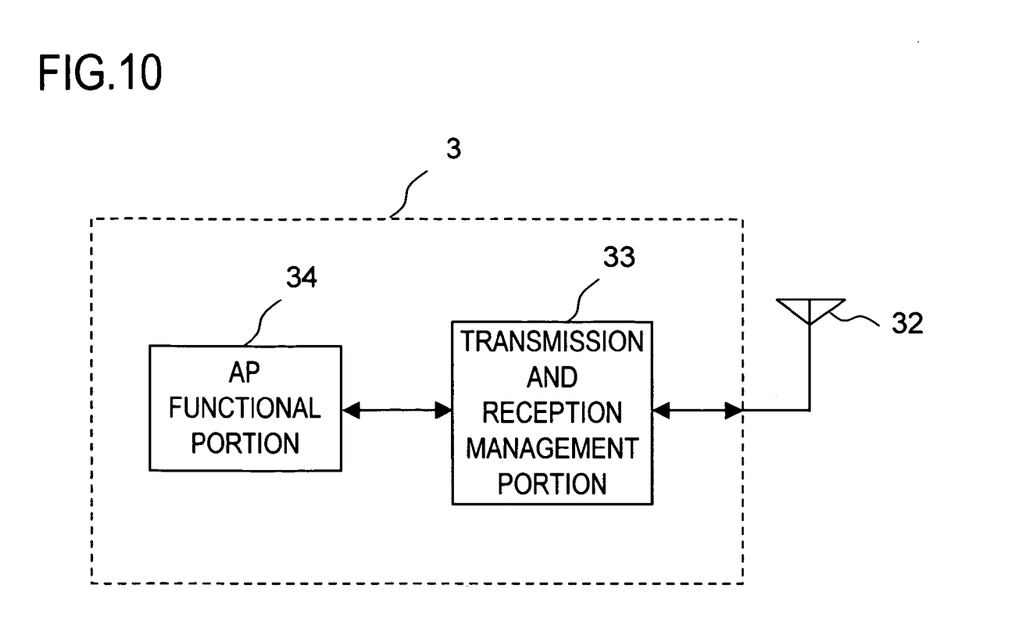
FIG. 10 is a block diagram showing a structure of an access point shown in FIG. 7.

FIG. 10 is a block diagram showing a structure of the access point 3 shown in FIG. 7. In FIG. 10, the same parts as in FIG. 7 are denoted by the same reference numerals. The access point 3 includes the non-directional antenna 32 having no directivity, a transmission and reception management portion (wireless LAN transmission and reception management portion) 33 and an AP functional portion 34.

The non-directional antenna 32 receives the intensity control data, the acknowledge data, the picture data and the like transmitted from the receiver 1*b* and (or) the transmitter 2*b*, and it sends the received data to the transmission and reception management portion 33. If a destination of the received data is itself (the access point 3), i.e., the received data is aimed at itself, the transmission and reception management portion 33 sends the received data to the AP functional portion 34. The AP functional portion 34 deals with a data aimed at itself (the access point 3) or a data that is unique to the access point. The destination of the intensity control data is the transmitter 2*b*, and the destination of the acknowledge data is the receiver 1*b* or the transmitter 2*b*. In addition, the destination of the picture data is the receiver 1*b*.

If a destination of a data received by the transmission and reception management portion 33 is another device (that is, the receiver 1*b* or the transmitter 2*b*), i.e., the received data is aimed at another device, the transmission and reception management portion 33 sends the received data to the non-directional antenna 32 so that the received data is transmitted to the original destination (the receiver 1*b* or the transmitter 2*b*). The non-directional antenna 32 converts the data sent from the transmission and reception management portion 33 into a radio wave, which is transmitted to the original destination. By this configuration of the access point 3, communication of the intensity control data, the acknowledge data, the picture data and the like between the receiver 1*b* and the transmitter 2*b* by using the non-directional antennas 12 and 22 is performed via the access point 3 (non-directional antenna 32).

Although the non-directional antennas 12 and 22 are used for transmitting the intensity control data from the receiver 1*b* to the transmitter 2*b* in the example described above, it is possible to use the directional antennas 11 and 21 for transmitting the intensity control data. More specifically, it is possible to configure so that the intensity control data from the intensity control data management portion 18*b* is transmitted from the directional antenna 11, and the intensity control data is received by the directional antenna 21. In this case, similarly to the above described case, the transmission signal intensity α is controlled in accordance with the intensity control data.

In addition, if the acknowledge data is not received from the directional antenna 21 in a predetermined time period after the transmission of the picture data (picture frame), the transmission and reception management portion 23b transmits the same picture data (picture frame) again (retransmission). However, it is possible to configure so that the intensity control portion 26b controls the transmission signal intensity α in such a way that the number of times of the retransmission in a unit time is kept at a predetermined reference value ref2 (constant value) (in this case, the intensity control data is not used for controlling the transmission signal intensity α). More specifically, it is preferable to increase the transmission signal intensity α if the number of the retransmission times per unit time is larger than the reference value ref2 and to decrease the transmission signal intensity α if the number of the retransmission times per unit time is smaller than the reference value ref2. Thus, the number of the retransmission times per unit time is maintained at the reference value ref2. As a result, the transmission signal intensity α can be kept at substantially a constant value. In this case, it is desirable to set the reference value ref2 to a value such that the transmission signal intensity α is kept at a minimum intensity that can transmit the picture data.

In addition, it is possible to control the transmission signal intensity α corresponding to a reception power of the acknowledge data transmitted from the receiver 1b to the transmitter 2b (a power of the signal of the acknowledge data received by the transmitter 2b) (in this case, the intensity control data is not used for controlling the transmission signal intensity α). More specifically, the larger the reception power is, the smaller the transmission signal intensity α is. The smaller the reception power is, the larger the transmission signal intensity α is. In this case too, it is desirable to control the transmission signal intensity α corresponding to the reception power so that the transmission signal intensity α becomes a minimum intensity that can transmit the picture data.

In the third embodiment described above, an adjustment of the transmission signal intensity α in the transmitter 2b is noted in particular since transmission quantity of the picture data from the transmitter 2b is large. However, it is possible to provide a mechanism similar to that for adjusting the intensity of the signal radiated from the directional antenna 21 of the transmitter 2b and also to adjust an intensity of the signal (showing the acknowledge data) radiated from the directional antenna 11 of the receiver 1b. In this case, the intensity of the signal radiated from the directional antenna 11 of the receiver 1b is set by a data outputted from the directional antenna 21 of the transmitter 2b.

Variations

Each of the receivers 1, 1a and 1b includes a wireless LAN module. The wireless LAN module included in each of the receivers 1, 1a and 1b is made up of a part obtained by removing the picture output portion 15 from the receivers 1, 1a and 1b shown in FIGS. 2, 5 and 8, respectively. In each of the receivers 1, 1a and 1b, it is possible to configure the wireless LAN module removable from the picture output portion 15. In other words, it is possible that the wireless LAN module is an optional component that can be attached to the picture output portion 15 externally in the receivers 1, 1a and 1b.

Each of the transmitters 2, 2a and 2b includes a wireless LAN module. The wireless LAN module included in each of the transmitters 2, 2a and 2b is made up of a part obtained by removing the picture data recording portion 25 from the transmitters 2, 2a and 2b shown in FIGS. 3, 6 and 9, respectively. In each of the transmitters 2, 2a and 2b, it is possible to configure the wireless LAN module removable from the picture data recording portion 25. In other words, it is possible that the wireless LAN module is an optional component that can be attached to the picture data recording portion 25 externally in the transmitters 2, 2a and 2b.

In the embodiments described above, picture data is exemplified as a data to be transmitted from the transmitter to the receiver. However, the data to be transmitted may be sound data. In this case, the picture output portion 15 as a picture display device in the receivers 1, 1a and 1b is replaced with a sound output device such as an audio device (other portions are also replaced if necessary). In addition, the data to be transmitted is not limited to a picture data or a sound data, but it can be other data. The embodiments described above can be applied to a data transmission between computers via a wireless LAN, too. If a data quantity of the data to be transmitted is large, the effect of low power consumption according to the present invention becomes conspicuous.

In the second and the third embodiments, the receivers 1a and 1b can transmit the intensity control data at any timing. The intensity control data may be transmitted periodically or at a timing when a user designates. In addition, the intensity control data may be transmitted only at a timing when the receiver 1a or 1b is activated. In addition, it is possible to configure so that the intensity control data is transmitted at a relatively high frequency if a picture data received by the receiver 1a or 1b has relatively many errors while it is transmitted at a relatively low frequency if the picture data has relatively few errors.

Although it is supposed that the radio wave outputted from the directional antennas 11 and 21 and the non-directional antennas 12, 22 and 32 is a radio wave defined by IEEE (Institute of Electrical and Electronic Engineers) 802.11b that is a standard for a wireless LAN in 2.4 GHz band or IEEE 802.11a that is a standard for a wireless LAN in 5 GHz band, it may be other radio wave defined by Bluetooth (a registered trade mark) or the like. Alternatively, it is possible to configure so that the picture data and the like are transmitted not by a radio wave but by light such as infrared rays. In other words, it is possible to configure the directional antennas 11 and 21 to be directional antennas for performing an optical communication (optical wireless communication).

The wireless transmission system according to one or more non-limiting embodiments can be used suitably for a picture display device or a picture contents recording device (picture recording device) equipped with an embedded or external wireless LAN module.

What is claimed is:

1. A wireless transmission system for transmitting a first data between a transmitter and a receiver by using a wireless communication, wherein the receiver is equipped with a first directional antenna for receiving the first data wirelessly and a first non-directional antenna, the transmitter is equipped with a second directional antenna for transmitting the first data wirelessly, a second non-directional antenna, and an intensity control portion for controlling an intensity of a signal radiated from the second directional antenna to be a minimum intensity that can transmit the first data by using the second directional antenna, the receiver and the transmitter perform a communication of a second data indicating a reception status of the first data in the receiver via the first non-directional antenna and the second non-directional antenna, and the intensity control portion controls the intensity based on the second data so that the intensity becomes the minimum intensity.

2. The wireless transmission system according to claim 1, wherein
the wireless transmission system further includes an access point having a third non-directional antenna, and
the communication of the second data between the receiver and the transmitter is performed via the third non-directional antenna.

3. The wireless transmission system according to claim 2, wherein
the transmitter determines whether or not it is possible to perform the communication of the first data by using the first directional antenna and the second directional antenna in accordance with the second data, and the transmitter includes a switching portion for switching an antenna for transmitting the first data from the second directional antenna to the second non-directional antenna if it is impossible to perform the communication of the first data by using the first directional antenna and the second directional antenna, and
after switching of the antenna, the communication of the first data between the receiver and the transmitter is performed via the third non-directional antenna by using the first non-directional antenna and the second non-directional antenna.

4. The wireless transmission system according to claim 3, wherein
the first data includes a picture data that is made up of a plurality of consecutive picture frames, and
the controlling of the intensity to be the minimum intensity corresponds to maintaining the number of picture frames per unit time that are not transmitted correctly to the receiver in a predetermined permissible delay time at a predetermined value that is larger than zero.

5. The wireless transmission system according to claim 2, wherein
the first data includes a picture data that is made up of a plurality of consecutive picture frames, and
the controlling of the intensity to be the minimum intensity corresponds to maintaining the number of picture frames per unit time that are not transmitted correctly to the receiver in a predetermined permissible delay time at a predetermined value that is larger than zero.

6. The wireless transmission system according to claim 1, wherein
the first data includes a picture data that is made up of a plurality of consecutive picture frames, and
the controlling of the intensity to be the minimum intensity corresponds to maintaining the number of picture frames per unit time that are not transmitted correctly to the receiver in a predetermined permissible delay time at a predetermined value that is larger than zero.

7. The wireless transmission system according to claim 1, wherein the first directional antenna and the second directional antenna are directional antennas for performing an optical communication.

8. A wireless transmission system for transmitting a first data between a transmitter and a receiver by using a wireless communication, wherein
the receiver is equipped with a first directional antenna for receiving the first data wirelessly,
the transmitter is equipped with a second directional antenna for transmitting the first data wirelessly and an intensity control portion for controlling an intensity of a signal radiated from the second directional antenna to be a minimum intensity that can transmit the first data by using the second directional antenna,
the first data includes a picture data that is made up of a plurality of consecutive picture frames, and
the controlling of the intensity to be the minimum intensity corresponds to maintaining the number of picture frames per unit time that are not transmitted correctly to the receiver in a predetermined permissible delay time at a predetermined value that is larger than zero.

9. The wireless transmission system according to claim 8, wherein the first directional antenna and the second directional antenna are directional antennas for performing an optical communication.

* * * * *